US011039380B2

(12) United States Patent
Kim et al.

(10) Patent No.: US 11,039,380 B2
(45) Date of Patent: Jun. 15, 2021

(54) METHOD FOR MOVING FROM NGS TO EPS IN WIRELESS COMMUNICATION SYSTEM AND APPARATUS THEREFOR

(71) Applicant: LG Electronics Inc., Seoul (KR)

(72) Inventors: Laeyoung Kim, Seoul (KR); Taehun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 118 days.

(21) Appl. No.: 16/346,662

(22) PCT Filed: Nov. 3, 2017

(86) PCT No.: PCT/KR2017/012409
§ 371 (c)(1),
(2) Date: May 1, 2019

(87) PCT Pub. No.: WO2018/084635
PCT Pub. Date: May 11, 2018

(65) Prior Publication Data
US 2020/0068481 A1    Feb. 27, 2020

Related U.S. Application Data

(60) Provisional application No. 62/425,080, filed on Nov. 22, 2016, provisional application No. 62/417,271, filed on Nov. 3, 2016.

(51) Int. Cl.
*H04W 48/16*      (2009.01)
*H04W 76/27*      (2018.01)
*H04W 8/08*       (2009.01)

(52) U.S. Cl.
CPC .......... *H04W 48/16* (2013.01); *H04W 8/08* (2013.01); *H04W 76/27* (2018.02)

(58) Field of Classification Search
None
See application file for complete search history.

(56) References Cited

U.S. PATENT DOCUMENTS

2012/0063305 A1* 3/2012 Chiu ............... H04W 74/0833
                                                    370/230
2012/0076085 A1* 3/2012 Chou ............... H04W 68/00
                                                    370/329

(Continued)

FOREIGN PATENT DOCUMENTS

CN    106068633 A    11/2016
JP    2016-529855 A    9/2016

(Continued)

OTHER PUBLICATIONS

LG Electronics, SK Telecom, "Migration solution with Evolved E-UTRAN to operate EPC and NextGen Core simultaneously", SA WG2 Meeting #117, Oct. 17-21, 2016, S2-165593.

(Continued)

*Primary Examiner* — Bunjob Jaroenchonwanit
(74) *Attorney, Agent, or Firm* — Dentons US LLP

(57) ABSTRACT

A method for moving user equipment (UE) from a next generation system (NGS) to an evolved packet system (EPS) in a wireless communication system comprises: by the UE, a step of determining to move to the EPS; and a step of transmitting a radio resource control (RRC) connection request and an attach request to the EPS. In the method for moving from the NGS to the EPS, if the UE has an ongoing voice call when determining to move to the EPS, the UE maintains the ongoing voice call by performing at least one of an access class barring (ACB) execution or a transmission of ongoing voice call related information by using "ongoing voice call" call type information.

2 Claims, 13 Drawing Sheets

(56) References Cited

U.S. PATENT DOCUMENTS

| | | | |
|---|---|---|---|
| 2012/0163168 A1* | 6/2012 | Choi | H04W 28/0289 |
| | | | 370/230 |
| 2013/0155994 A1* | 6/2013 | Yoshizawa | H04W 74/008 |
| | | | 370/329 |
| 2013/0217391 A1* | 8/2013 | Klatt | H04W 8/24 |
| | | | 455/435.2 |
| 2013/0252573 A1* | 9/2013 | Dong | H04W 4/90 |
| | | | 455/404.1 |
| 2014/0080533 A1* | 3/2014 | Tabrizi | H04W 72/08 |
| | | | 455/513 |
| 2014/0080534 A1* | 3/2014 | Farhadi | H04W 88/04 |
| | | | 455/513 |
| 2014/0171061 A1* | 6/2014 | Larmo | H04W 74/006 |
| | | | 455/422.1 |
| 2015/0071064 A1* | 3/2015 | Geng | H04W 48/04 |
| | | | 370/230 |
| 2015/0173074 A1* | 6/2015 | Zhao | H04W 74/085 |
| | | | 370/336 |
| 2016/0157290 A1 | 6/2016 | Lee et al. | |
| 2016/0227468 A1 | 8/2016 | Jaehyun et al. | |
| 2016/0330648 A1* | 11/2016 | Hwang | H04W 48/02 |
| 2016/0381713 A1* | 12/2016 | Hwang | H04W 74/0833 |
| | | | 370/329 |
| 2017/0048112 A1* | 2/2017 | Ronneke | H04L 41/12 |
| 2017/0048127 A1* | 2/2017 | Almodovar Chico | |
| | | | H04W 36/30 |
| 2017/0223609 A1* | 8/2017 | Fong | H04W 28/0284 |
| 2017/0290084 A1* | 10/2017 | Wu | H04W 76/30 |
| 2018/0049213 A1* | 2/2018 | Gholmieh | H04W 72/1215 |
| 2018/0139783 A1* | 5/2018 | Park | H04W 88/08 |
| 2018/0227394 A1* | 8/2018 | King | H04L 67/2861 |
| 2018/0359614 A1* | 12/2018 | Yu | H04W 72/005 |
| 2019/0141563 A1* | 5/2019 | Ianev | H04W 28/065 |
| 2019/0150033 A1* | 5/2019 | Da Silva | H04W 48/06 |
| | | | 370/230 |
| 2019/0150219 A1* | 5/2019 | Wang | H04W 76/30 |
| | | | 370/329 |
| 2019/0159078 A1* | 5/2019 | Wang | H04W 76/11 |
| 2019/0174003 A1* | 6/2019 | Chandramouli | H04L 65/1016 |
| 2019/0182296 A1* | 6/2019 | Zeng | H04L 65/1006 |
| 2019/0182755 A1* | 6/2019 | Robb | H04W 12/06 |
| 2019/0191348 A1* | 6/2019 | Futaki | H04W 36/0033 |
| 2019/0239271 A1* | 8/2019 | Guerzoni | H04W 76/16 |
| 2019/0246445 A1* | 8/2019 | Centonza | H04W 76/27 |
| 2019/0357120 A1* | 11/2019 | Fu | H04W 48/10 |
| 2020/0037345 A1* | 1/2020 | Ryoo | H04W 76/27 |
| 2020/0092901 A1* | 3/2020 | Barabell | H04W 72/1263 |
| 2020/0137127 A1* | 4/2020 | Chin | H04W 76/50 |
| 2020/0169863 A1* | 5/2020 | Kim | H04W 76/50 |
| 2020/0267607 A1* | 8/2020 | Stojanovski | H04W 88/06 |

FOREIGN PATENT DOCUMENTS

| | | |
|---|---|---|
| WO | 2014084596 A1 | 6/2014 |
| WO | 2015142048 A1 | 9/2015 |
| WO | 2016145575 A1 | 9/2016 |

OTHER PUBLICATIONS

Qualcomm Incorporated, Huawei, Nokia, "Way forward on EPC-NG Core Interworking", SA WG2 Meeting #117, Oct. 17-21, 2016, S2-165667.

LG Electronics, SK Telecom, "Migration solution with Evolved E-UTRAN to operate EPC and NextGen Core simultaneously", SA WG2 Meeting #117, Oct. 17-21, 2016, S2-166262.

"3rd Generation Partnership Project; Technical Specification Group Services and System Aspects; Study on Architecture for Next Generation System (Release 14)", 3GPP TR 23.799 V1.1.0, Oct. 31, 2016.

"3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331, V10.2.0 (Jun. 2011).

\* cited by examiner

METHOD FOR MOVING FROM NGS TO EPS IN WIRELESS COMMUNICATION SYSTEM AND APPARATUS THEREFOR

This application is a National Stage Entry of International Application No. PCT/KR2017/012409 filed Nov. 3, 2017, which claims priority to U.S. Provisional Application Nos. 62/417,271 filed Nov. 3, 2016 and 62/425,080 filed Nov. 22, 2016, all of which are incorporated herein by reference.

TECHNICAL FIELD

The present disclosure relates to a wireless communication system, and more particularly, to a method and apparatus for moving a User Equipment (UE) with an ongoing voice call from a Next Generation System (NGS) to an Evolved Packet System (EPS).

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

DISCLOSURE

Technical Problem

The object of the present disclosure is to provide a method of maintaining an ongoing voice call of a UE when the UE moves between an NGS and an EPS.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided is a method of moving from a Next Generation System (NGS) to an Evolved Packet System (EPS) by a User Equipment (UE) in a wireless communication system. The method may include: determining, by the UE, to move to the EPS; and transmitting a Radio Resource Control (RRC) Connection Request and an Attach Request to the EPS. When the UE determines to move to the EPS, if the UE has an ongoing voice call, the UE may maintain the ongoing voice call by performing at least one of: executing Access Class Barring (ACB) using 'ongoing voice call' call type information; or transmitting information related to the ongoing voice call.

In another aspect of the present disclosure, provided is a User Equipment (UE) device for moving from a Next Generation System (NGS) to an Evolved Packet System (EPS) in a wireless communication system. The UE device may include: a transceiver; and a processor. The processor may be configured to determine movement of the UE to the EPS and transmit a Radio Resource Control (RRC) Connection Request and an Attach Request to the EPS. When the UE determines to move to the EPS, if the UE has an ongoing voice call, the UE may maintain the ongoing voice call by performing at least one of: executing Access Class Barring (ACB) using 'ongoing voice call' call type information; or transmitting information related to the ongoing voice call through the transceiver.

Executing the ACB may include: generating, by the UE, a random number and comparing the random number with a barring factor corresponding to the 'ongoing voice call' call type information; and if the random number is greater than the barring factor, determining to perform random access.

The barring factor may be obtained from system information.

The barring factor corresponding to the 'ongoing voice call' call type information may be configured to be smaller than a barring factor corresponding to an 'originating signalling' call type.

When transmitting the information related to the ongoing voice call, the UE may be excluded from application of congestion control performed by a network node receiving the information related to the ongoing voice call.

The information related to the ongoing voice call may correspond to an 'ongoing voice call' establishment cause.

The 'ongoing voice call' establishment cause may be included in the RRC Connection Request, and the network node may be an evolved Node B (eNB).

The information related to the ongoing voice call may correspond to information indicating that the ongoing voice call is present.

The information indicating that the ongoing voice call is present may be included in the Attach Request, and the network node may be a Mobility Management Entity (MME).

The information indicating that the ongoing voice call is present may be included in a Packet Data Network (PDN) Connection Request, and the network node may be a Mobility Management Entity (MME).

The PDN Connection Request may be included in the Attach Request.

There may be no interface between a Mobility Management Entity (MME) of the EPS and an Access and Mobility Management Function (AMF) of the NGS.

The movement determination may be made when the UE is out of coverage of the NGS.

The movement determination may be made either by a selection from the UE or by an instruction from the NGS.

Advantageous Effects

According to the present disclosure, a UE may move between an NGS and an EPS having no interface therebetween while maintaining an ongoing voice call.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the present disclosure and are incorporated in and constitute a part of this application, illustrate embodiments of the present disclosure and together with the description serve to explain the principle of the disclosure. In the drawings.

MODE FOR THE INVENTION

Figure 1:
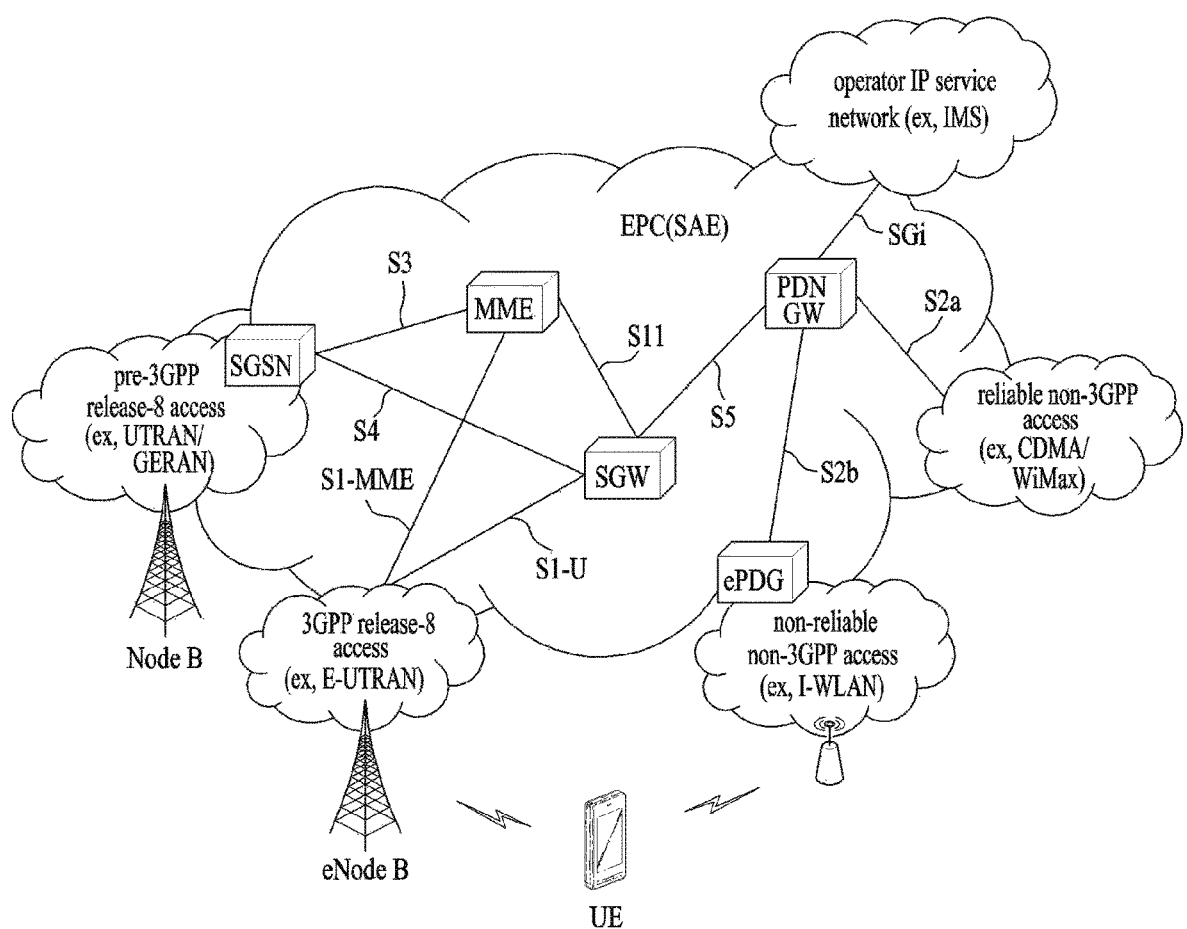
FIG. 1 is a schematic diagram illustrating the structure of an Evolved Packet System (EPS) including an Evolved Packet Core (EPC)

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The following technology may be used for various wireless communication systems. Although the present disclosure will be described based on the 3GPP LTE and 3GPP LTE-A systems, it is apparent that the disclosure is not limited thereto.

Terminologies used herein are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data is exchanged through a direct data path without passing through a 3GPP core network (e.g., EPC).

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |

TABLE 1-continued

| Reference point | Description |
| --- | --- |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
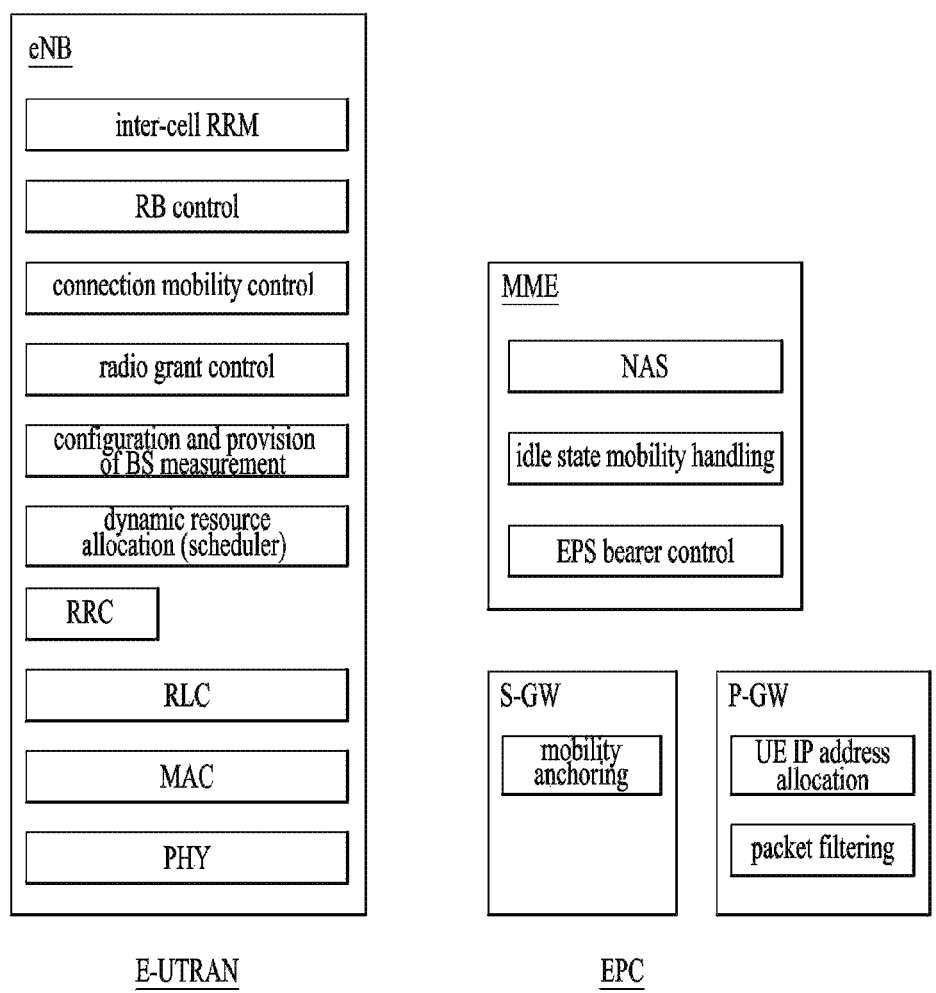
FIG. 2 is a diagram illustrating the general architectures of an E-UTRAN and an EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
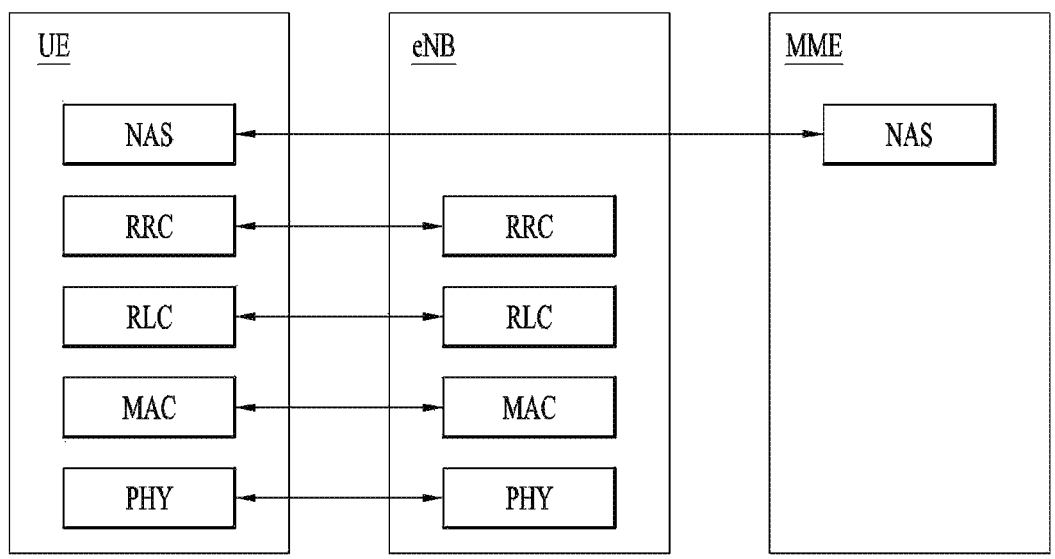
FIG. 3 is a diagram illustrating the structure of a radio interface protocol in a control plane.
Figure 4:
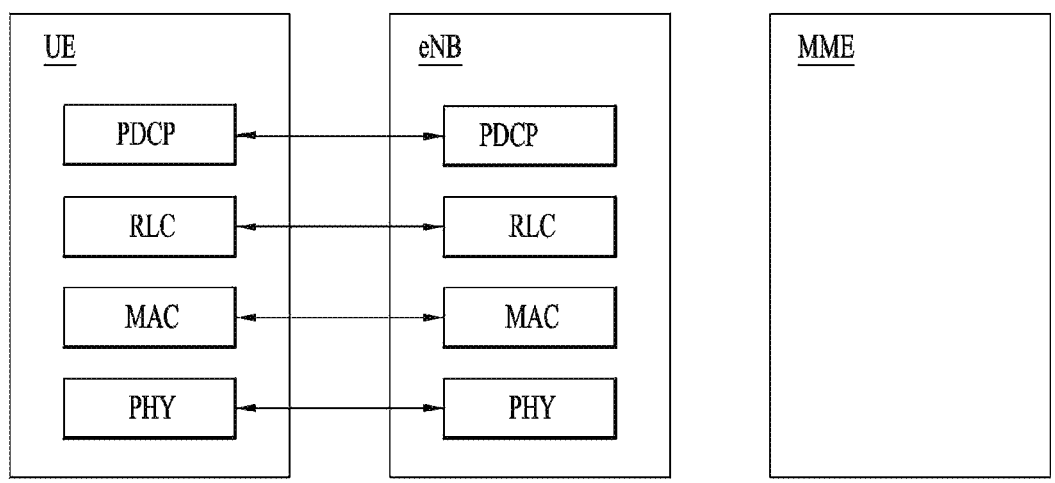
FIG. 4 is a diagram illustrating the structure of a radio interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
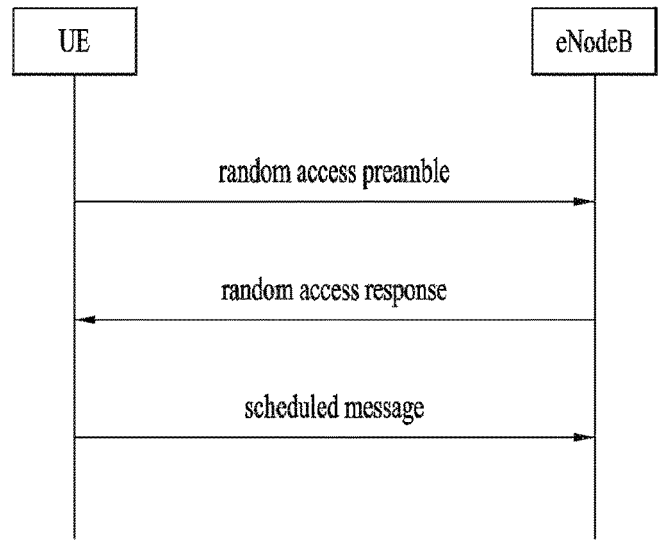
FIG. 5 is a flowchart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
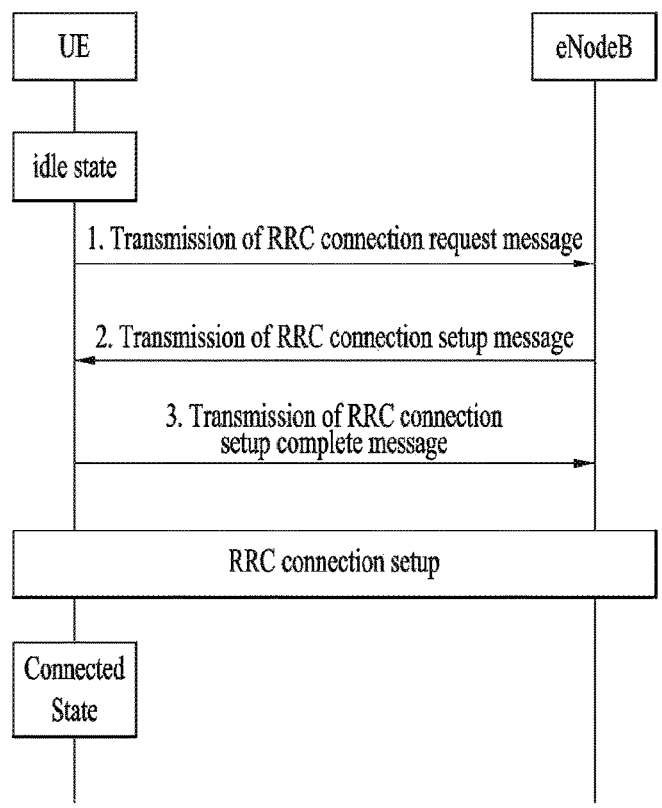
FIG. 6 is a diagram illustrating a connection process in a Radio Resource Control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC Connection Request message from the UE to the eNodeB, transmission of an RRC Connection Setup message from the eNodeB to the UE, and transmission of an RRC Connection Setup Complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC Connection Request message to the eNodeB first.

2) Upon receiving the RRC Connection Request message from the UE, the ENB accepts the RRC connection request of the UE when the radio resources are sufficient, and then transmits an RRC Connection Setup message, which is a response message, to the UE.

3) Upon receiving the RRC Connection Setup message, the UE transmits an RRC Connection Setup Complete message to the eNodeB. Only when the UE successfully transmits the RRC Connection Setup message, does the UE establish RRC connection with the eNode B and transition to the RRC connected mode.

Figure 7:
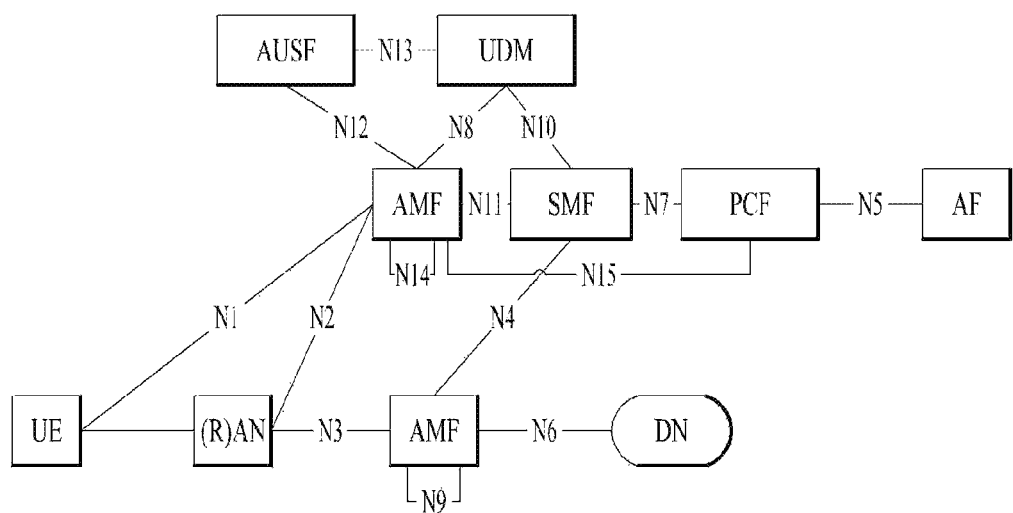
FIG. 7 is a diagram illustrating a 5G system.

An MME in a legacy EPC is divided into a Core Access and Mobility Management Function (AMF) and a Session Management Function (SMF) in a next generation system (i.e., 5G Core Network (CN)). Thus, the AMF is in charge of NAS interaction with a UE and Mobility Management (MM), and the SMF is in charge of Session Management (SM). In addition, the SMF manages a User Plane Function (UPF), which corresponds to a gateway for routing user traffic, that is, a gateway managing a user plane. This may be interpreted to mean that the SMF is in charge of the control plane of an S-GW and a P-GW of the legacy EPC and the UPF is in charge of the user plane thereof. For user traffic routing, at least one UPF may exist between a RAN and a Data Network (DN). In other words, the legacy EPC can be implemented in the 5G system as illustrated in FIG. 7. In addition, as a concept corresponding to a PDN connection in the legacy EPS, a Protocol Data Unit (PDU) session is defined in the 5G system. The PDU session means association between a UE and a DN, which provides not only an IP type but also an Ethernet type or an unstructured type of PDU connectivity service. Moreover, Unified Data Management (UDM) serves as an HSS of the EPC, and a Policy Control Function (PCF) serves as a PCRF of the EPC. To satisfy the requirements of the 5G system, these functions can be extended. Details of the 5G system architecture, individual functions, and individual interfaces can be found in TS 23.501.

For interworking between a 3GPP Evolved Packet System (EPS) and a Next Generation System (NGS or NG system) (i.e., the next-generation 5G mobile communication system), interworking and migration need to be supported. Hereinafter, the solutions for supporting the interworking and migration will be described in brief with reference to FIGS. 8 to 11.

If possible, an installed E-UTRAN is upgraded to support a new CN-RAN interface for an NG core (NG2/NG3). This approach allows tight interworking between upgraded E-UTRAN access and NG RAN access.

Loose interworking based on the "dual attach" or "handover attach" operation (i.e., "single radio" or "dual radio" support at lower layers) in an area where the installed E-UTRAN is not upgraded. That is, the same type of interworking as GERAN and UTRAN access is supported.

Figure 8:
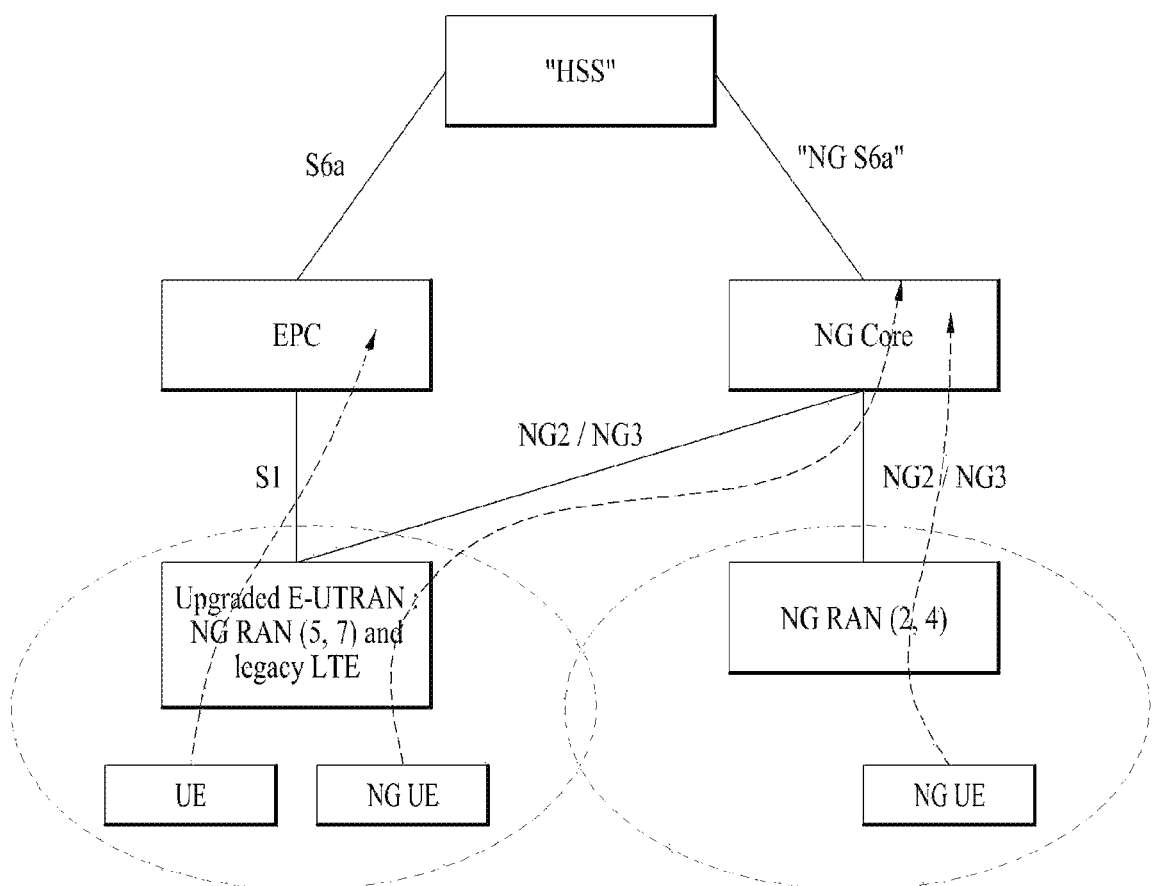
FIGS. 8 to 10 are diagrams illustrating interworking structures.

FIG. 8 illustrates a system architecture that allows tight interworking between an evolved NG RAN anchored on E-UTRA (options 5 and 7 specified in Annex J: Deployment Scenarios in TR 23.799) and an NG RAN anchored on NR (options 2 and 4 specified in Annex J: Deployment Scenarios in TR 23.799).

It is assumed that in addition to supporting an S1 interface towards an EPC, an installed E-UTRAN base is upgraded to support a new CN-RAN interface ("NG2/NG3" in FIG. 8). In addition, it is assumed that on the radio side, the upgraded E-UTRAN base supports a legacy LTE-Uu interface in addition to E-UTRA anchored NR (options 5 and 7 specified in Annex J: Deployment Scenarios in TR 23.799). When legacy and NG UEs are under coverage of the upgraded E-UTRAN base, they are steered towards the EPC but the NG UEs are steered towards an NG core. The NAS protocol used between the NG UE and the NG core ("NG NAS") is different from the legacy NAS protocol used between the legacy UE and the EPC ("EPS NAS"). The EPC and the NG core have access to a common subscriber database ("HSS") but have no other interworking interfaces therebetween. Thus, there is no legacy baggage carried over to the NG core.

Figure 9:
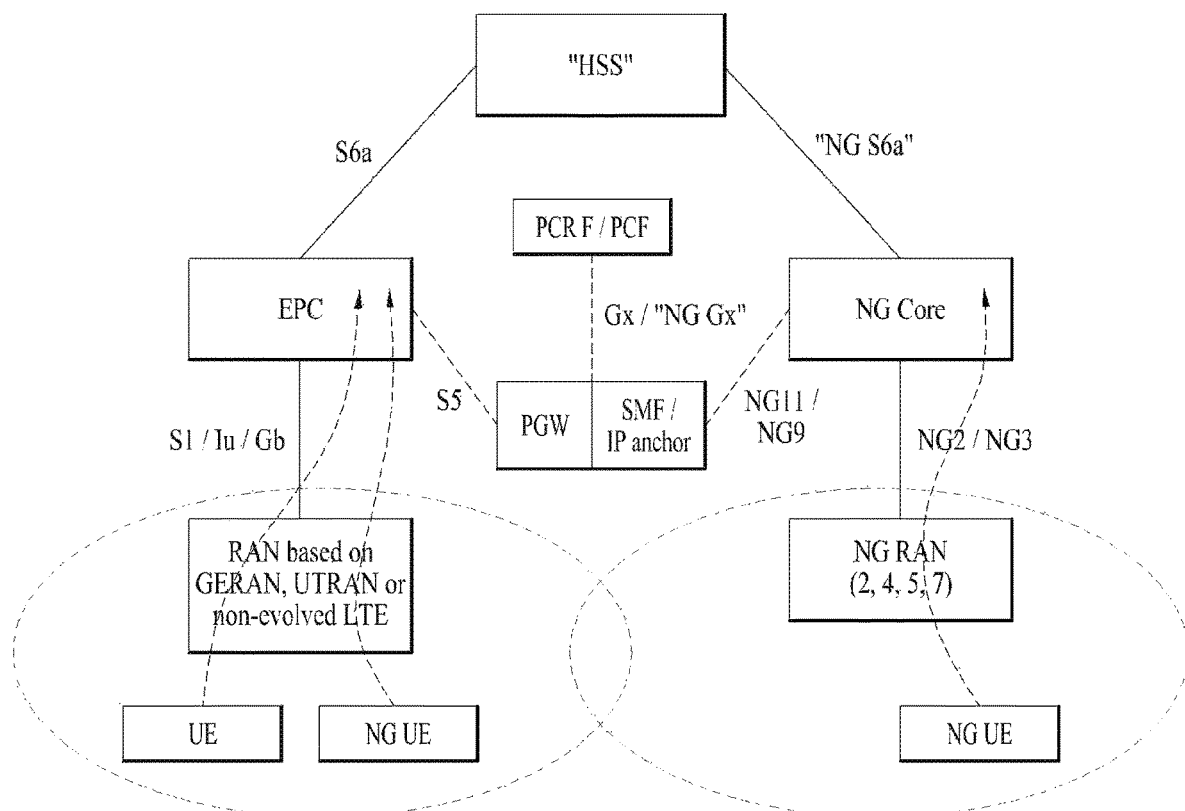

FIG. 9 illustrates a simple system architecture that allows loose interworking between a GERAN, a UTRAN or a non-evolved E-UTRAN on one side and an NG RAN on the other side.

In this case, an NG UE under coverage of the GERAN, UTRAN or non-evolved E-UTRAN access is steered towards an EPC.

In the case of dual coverage (i.e., both under the GERAN/UTRAN/EUTRAN access and under the NG RAN access (options 2, 4, 5, and 7 specified in Annex J: Deployment Scenarios in TR 23.799)), a UE operates in "dual attach" mode. That is, the UE uses two independent systems, i.e., two independent Mobility Management and Session Management contexts. At lower layers, the UE may operate in "single radio" or "dual radio" mode depending on the support that will be defined by RAN working groups.

The EPC and an NG core may have access to a common subscriber base ("HSS"). However, the EPC and the NG core may selectively share a common PGW/SMF/IP anchor in order to perform handover using an IP address preservation function (similar to how 3GPP-WLAN handover occurs in the EPS). The normal PGW/SMF/IP anchor supports NG11 towards an MMF in the NextGen core and NG9 towards a UPF in the NextGen core. If dynamic PCC support is needed, the EPC and the NG core share a common PCRF/PCF node.

The handover procedure from a source to a target system is based on the "handover attach" procedure defined for 3GPP-WLAN interworking. In the target system, all QoS structures (i.e., EPS bearers or QoS flows) are completely re-established from the beginning, and mapping between the two is defined later.

If the EPC and the NG core share no common PGW/SMF/IP anchor, service continuity may be provided in handover by utilizing a "higher layer" service continuity mechanism.

In the case of an IMS voice service established via the NG core, service continuity may be provided in handover from a GERAN or a UTRAN by using Dual Radio VCC (DRVCC) as described in TS 23.237.

Figure 10:
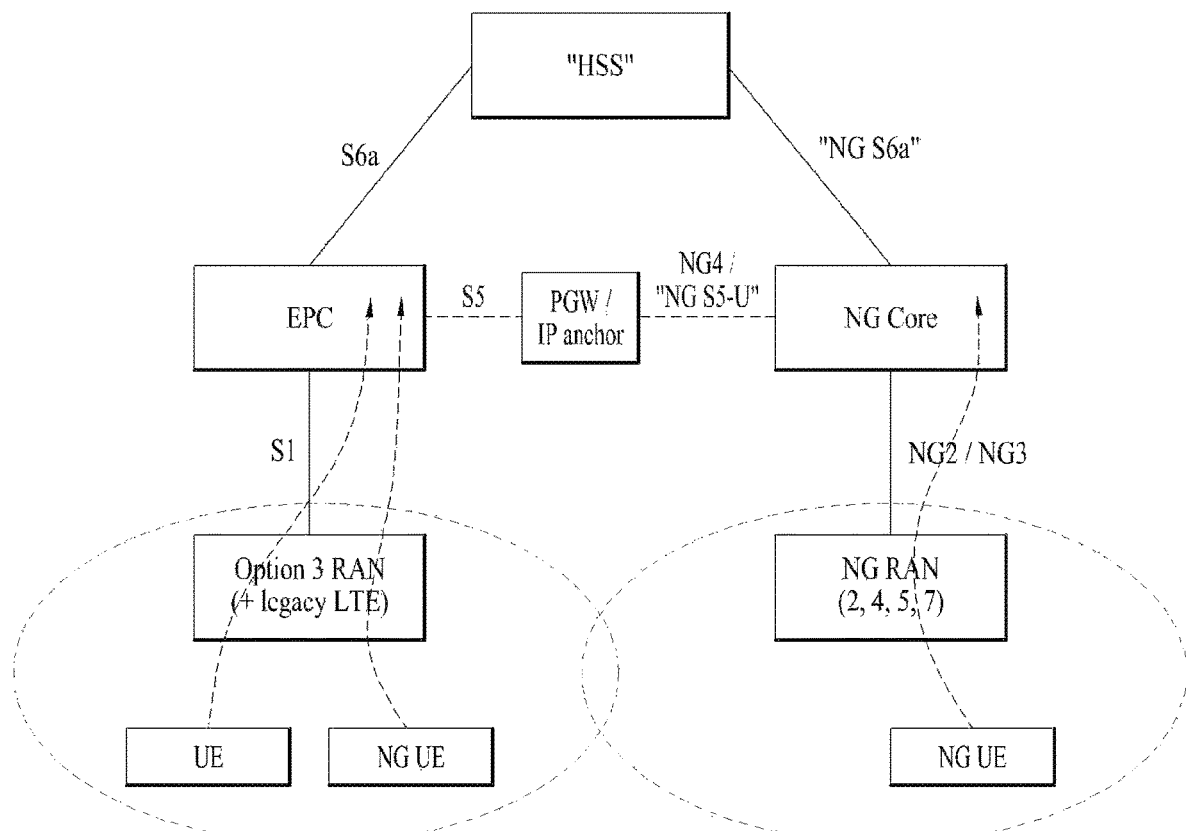

The above-described loose interworking solution can also be applied to interworking between an Option 3 RAN connected to an EPC and an NG RAN connected to an NG core (specified in Annex J: Deployment Scenarios in TR 23.799) as illustrated in FIG. 10. The interworking can be smoothly achieved if the combination of radio bands used in an areas served by the Option 3 RAN and radio bands used in an area served by the NG system allows the "dual attach" (or "handover attach") operation. Alternatively, the interworking between the Option 3 RAN connected to the EPC and the NG RAN can also be supported using tight interworking based on the principles deduced from FIG. 8. This means that an E-UTRAN node that has been upgraded once to support Option 3 needs to be upgraded a second time to support NG2/NG3 towards the NG core.

Figure 11:
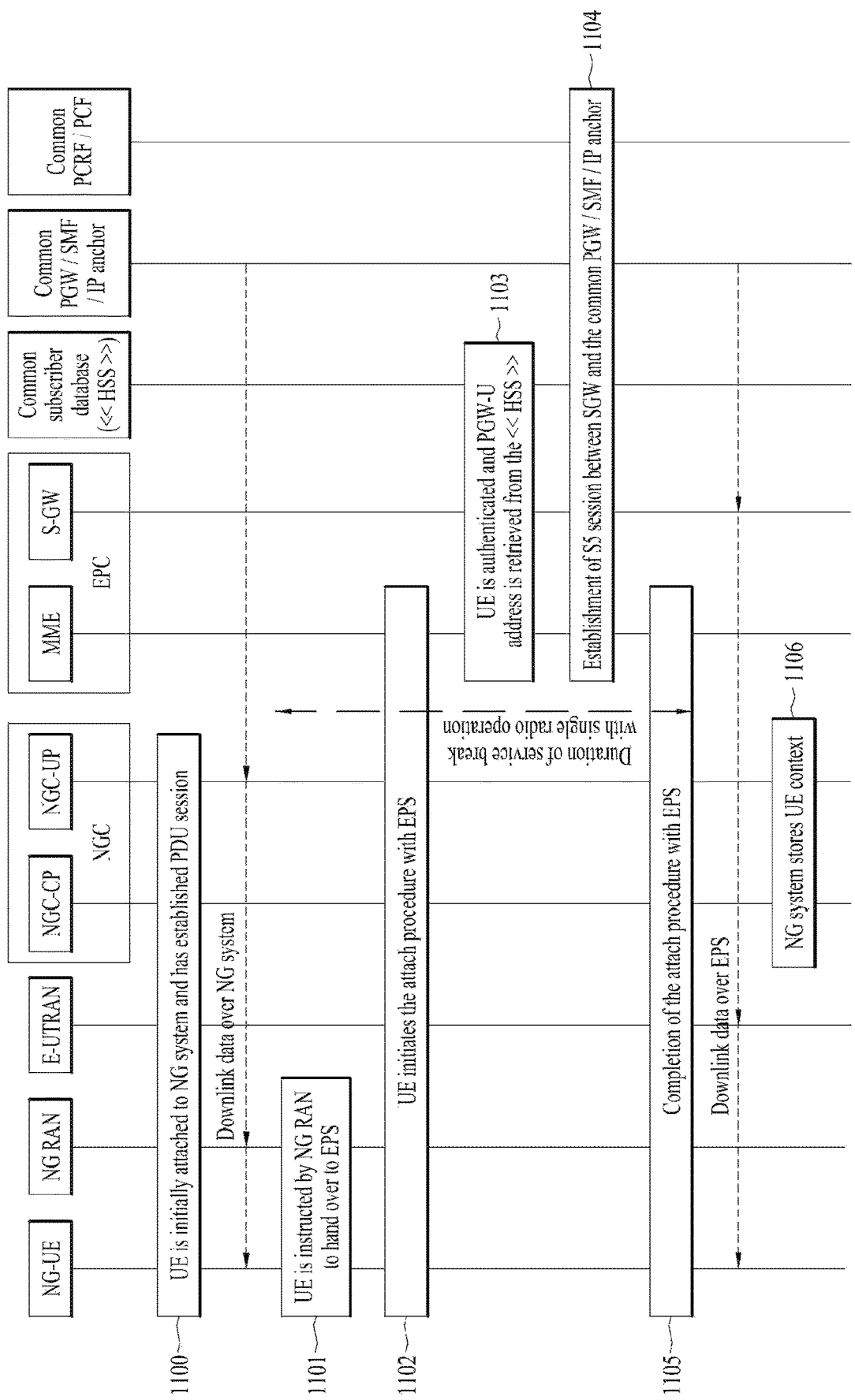
FIG. 11 is a diagram illustrating inter-system movement in an interworking structure.

FIG. 11 illustrates the call flow of a "handover attach" procedure when a UE moves from an NG system to an EPS. The call flow in the opposite direction is similar as well. Referring to FIG. 11, the UE is connected to the NG system and establishes a PDU session in step S1100.

At some points (for example, when the UE is in the border area of an NG system island), the UE is instructed by an NG RAN to perform "handover attach" to the target system (i.e., the EPS). The RAN will design measurement of E-UTRAN cells while the UE is under NR coverage, and vice versa.

In step S1102, the UE initiates an Attach procedure towards the EPS.

In step S1103, as part of the Attach procedure, the UE is authenticated, and a PGW address is retrieved from a common subscriber database ("HSS").

In step S1104, an S5 session between an SGW and a PGW part of a common PGW/SMF/IP anchor is established, and at this point, DL traffic is diverted towards EPS access.

In step S1105, the UE communicating over the EPS completes the Attach procedure. If a dedicated EPS bearer is required, it is established as part of the Attach procedure based on information provided by a PCRF/PCF.

In step S1106, a Control Plane (CP) function in the NG system stores a UE context during a certain period of time.

According to the above-described solutions in TR 23.799, although an EPS and an NGS share only gateways to simplify the interworking architecture therebetween, there is no interface between MM entities of the systems (that is, an AMF or MMF is described as a control plane function for managing an MME in the EPS and MM in the NGS). As a result, when a UE moves from one system to the other system, a network cannot hand over an MM context to the target system. Thus, the UE should perform an Attach procedure when changing the system. For example, if a UE moves out of New Radio (NR) coverage (i.e., 5G radio coverage) while performing a voice call (here, the voice call means a PS voice call or an IMS voice call), the UE should change RAT to the LTE to receive services. In this case, the UE should attach to the EPS. However, as shown in FIG. 11, when the UE moves between the EPS and NGS, the UE suffers from long service interruptions due to the Attach operation even though the UE does not change the P-GW. If an eNB or MME rejects and/or back off a connection request transmitted from the UE that intends to attach to the EPS network due to congestion in a RAN and/or a core network, it may cause negative effects to the voice call with real-time traffic characteristics and thus degrade user experience.

Accordingly, a method of reducing a serving interruption time or maintaining an ongoing voice call when a UE with the ongoing voice call attaches to a target system due to movement between an EPS and an NGS (herein, the ongoing voice call may include an ongoing PS voice call, ongoing PS video call, ongoing IMS voice call, ongoing IMS video call, ongoing MMTel voice, ongoing MMTel video, ongoing voice call, ongoing video call, etc.).

Embodiment

When a UE determines to move from an NGS to an EPS, the UE may transmit a Radio Resource Control (RRC) Connection Request and an Attach Request to the EPS.

If the UE has an ongoing voice call when determining to move to the EPS, the UE may maintain the ongoing voice call by performing at least one of: executing Access Class Barring (ACB) using 'ongoing voice call' call type information; or transmitting information related to the ongoing voice call. In other words, to maintain the ongoing voice call, the UE may either perform the ACB using the 'ongoing voice call' call type information or transmit the information related to the ongoing voice call. Alternatively, the UE may perform the two operations. In the following, the two operations will be described separately.

UE-Dominant Method

When a UE determines to move to an EPS, if the UE has an ongoing voice call, the UE performs ACB using 'ongoing voice call' call type information. Here, the execution of the ACB may mean that the UE creates a random number, compares the random number with a barring factor corresponding to the 'ongoing voice call' call type information, and then determines to perform random access if the random number is greater than the barring factor. When the UE determines to perform the random access, the UE transmits an RRC Connection Request to an eNB.

The barring factor is obtained from system information (e.g., a System Information Block (SIB)) and corresponds to a probability value in the range of 0 and 1, which determines whether to block an RACH when a network is congested. A barring time is an average waiting time required until the RACH blocked by the ACB is attempted again.

In particular, according to the present embodiment, the barring factor corresponding to the 'ongoing voice call' call type information may be configured to be smaller than a barring factor corresponding to an 'originating signalling' call type. As a result, the UE may be configured not to block a random access procedure for the ongoing voice call.

Network-Node-Dominant Method

When a UE transmits information related to an ongoing voice call, the UE may be excluded from application of congestion control performed by a network node that receives the information related to the ongoing voice call. Alternatively, the network node receiving the information related to the ongoing voice call may accept/approve a request (for example, an RRC Connection Request, an Attach Request, a PDN Connection (Connectivity) Request, etc., which will be described later) from the UE transmitting the information related to the ongoing voice call obligatorily/with high probability/with high priority.

As a particular example, information related to an ongoing voice call may be an 'ongoing voice call' establishment cause. The 'ongoing voice call' establishment cause may be included in an RRC Connection Request, and the network node may be an eNB. That is, the NAS layer of a UE transfers, to the AS layer, 'ongoing voice call' corresponding to a newly defined establishment cause value in order to transmit an Attach Request message to the network. In other words, the establishment cause value to be provided to the AS layer is set to 'ongoing voice call'. The newly defined 'ongoing voice call' establishment cause value may indicate that the UE is processing a voice call (or has a session for the voice call). Alternatively, it may indicate that the UE is processing a video call (or has a session for the video call). Further, a separate establishment cause value (e.g., "ongoing video call") may be defined and use to indicate that the UE is processing the video call.

When the AS layer of the UE receives the Attach Request message and the newly defined establishment cause value from the NAS layer, the AS layer transmits the received establishment cause value to the eNB by including it in an RRC Connection Request message. Upon receiving the RRC Connection Request message, the eNB recognizes that the UE sends the RRC Connection Request while the UE has the ongoing voice/video call and then determines to accept the RRC Connection Request by considering the fact that the UE sends the RRC Connection Request while having the ongoing voice/video call. This may be interpreted to mean that the RRC Connection Request should be accepted with high priority. Alternatively, it may mean that when congestion control is applied, the congestion control is not applied thereto by prioritizing the RRC Connection Request. The priority criterion may mean that it has high priority compared to the establishment cause value of at least one of emergency, mt-Access, mo-Signalling, mo-Data, delayTolerantAccess-v1020, and mo-VoiceCall-v1280.

As another example, information related to an ongoing voice call may be information indicating that the ongoing voice call is present, and it may be transmitted to an MME through an Attach Request. Specifically, when a UE (i.e., the NAS layer or EMM layer of the UE) transmits an Attach Request message to an MME, the UE may include a newly defined parameter in the Attach Request message to indicate that there is an ongoing voice call or an ongoing video call. To include such a parameter, an existing information element may be used, or a new information element may be defined and used. A single parameter may indicate that there is an ongoing voice call or an ongoing video call, or parameters may be defined to indicate an ongoing voice call and an ongoing video call, respectively.

Upon receiving the Attach Request message including the newly defined parameter, the MME may recognize that the UE has a session for the voice/video call and then determine whether to accept the Attach Request based on the fact that the UE has the session for the voice/video call. This may be interpreted to mean that the Attach Request should be accepted with high priority. Alternatively, it may mean that when congestion control is applied, the congestion control is not applied thereto by prioritizing the Attach Request. The congestion control may be MM congestion control and/or SM congestion control. The SM congestion control may be performed such that based on the newly defined parameter included in the Attach Request message (this is not contained in a PDN Connection (Connectivity) Request included therein), the EMM layer of the MME informs the ESM layer that the ongoing voice/video call exists. This operation may be performed since the requested and generated PDN connection is a PDN connection for supporting an IMS service (or at least one of a voice call, video call, MMTel voice, and MMTel video). Alternatively, the operation may be performed since the APN of the PDN connection is the APN for an IMS. The priority criterion may mean that it has high priority compared to either or both of an Attach Request with low priority and an Attach Request with no low priority and no new parameter.

As still another example, information indicating that there is an ongoing voice call may be included in a Packet Data Network (PDN) Connection Request, the network node may be an MME, and the PDN Connection Request may be included in an Attach Request. That is, a new parameter is added to a PDN Connection (Connectivity) Request message included in an Attach Request message. A UE (i.e., the NAS layer or ESM layer of the UE) includes the newly defined parameter in the PDN Connection (Connectivity) Request message included in the Attach Request message in order to indicate that there is an ongoing voice call or an ongoing video call. To include such a parameter, an existing information element may be used, or a new information element may be defined and used. A single parameter may indicate that there is an ongoing voice call or an ongoing video call, or parameters may be defined to indicate an ongoing voice call and an ongoing video call, respectively.

The ESM layer of the UE may be instructed by the EMM layer to include the presence of the ongoing voice/video call or information indicating that the ongoing voice/video call exists in the PDN Connection (Connectivity) Request message. Alternatively, instead of the ESM layer, the EMM layer of the UE may include the parameter newly defined for indicating that the ongoing voice call or ongoing video call is present in the PDN Connection (Connectivity) Request message included in the Attach Request message. Since details of the parameter are described above, they are not repeated here. The PDN connection may be a PDN connection for supporting an IMS service (or at least one of a voice call, video call, MMTel voice, and MMTel video). Alternatively, the APN of the PDN connection may be the APN of an IMS.

Upon receiving the Attach Request message including the PDN Connection (Connectivity) Request containing the newly defined parameter, the MME may recognize that the UE has a session for the voice/video call and then determine whether to accept the PDN Connectivity Request based on the fact that the UE has the session for the voice/video call. This may be interpreted to mean that the PDN Connectivity Request should be accepted with high priority. Alternatively, it may mean that when congestion control is applied, the congestion control is not applied thereto by prioritizing the PDN Connectivity Request. The congestion control may be MM congestion control and/or SM congestion control. The MM congestion control may be performed such that based on the newly defined parameter included in the PDN Connection (Connectivity) Request, the ESM layer of the MME informs the EMM layer that the ongoing voice/video call exists. The priority criterion may mean that it has high priority compared to either or both of a PDN Connection (Connectivity) Request with low priority and a PDN Connection (Connectivity) Request with no low priority and no new parameter.

As a further example, information indicating that there is an ongoing voice call may be transmitted to an MME being included in an independent PDN Connection Request instead of being included in an Attach Request. In addition, considering that a PDN connection for supporting an IMS service (or at least one of a voice call, video call, MMTel voice, and MMTel video) is not created after a UE performs an Attach procedure, such a PDN Connection (Connectivity) Request message may be regarded as a PDN Connection Generation Request for creating the corresponding PDN connection. The UE (i.e., the NAS layer or ESM layer of the UE) includes a newly defined parameter in the PDN Connection (Connectivity) Request message in order to indicate that there is an ongoing voice call or an ongoing video call. To include such a parameter, an existing information element may be used, or a new information element may be defined and used. A single parameter may indicate that there is an ongoing voice call or an ongoing video call, or parameters may be defined to indicate an ongoing voice call and an ongoing video call, respectively. The ESM layer of the UE may be instructed by the EMM layer to include the presence of the ongoing voice/video call or information indicating that the ongoing voice/video call exists in the PDN Connection (Connectivity) Request message.

Upon receiving the PDN Connection (Connectivity) Request message including the newly defined parameter, the MME may recognize that the UE has a session for the voice/video call and then determine whether to accept the PDN Connectivity Request based on the fact that the UE has the session for the voice/video call. This may be interpreted to mean that the PDN Connectivity Request should be accepted with high priority. Alternatively, it may mean that when congestion control is applied, the congestion control is not applied thereto by prioritizing the PDN Connectivity Request. The priority criterion may mean that it has high priority compared to either or both of a PDN Connection (Connectivity) Request with low priority and a PDN Connection (Connectivity) Request with no low priority and no new parameter.

Example 1 of Particular Moving Procedure

Figure 12:
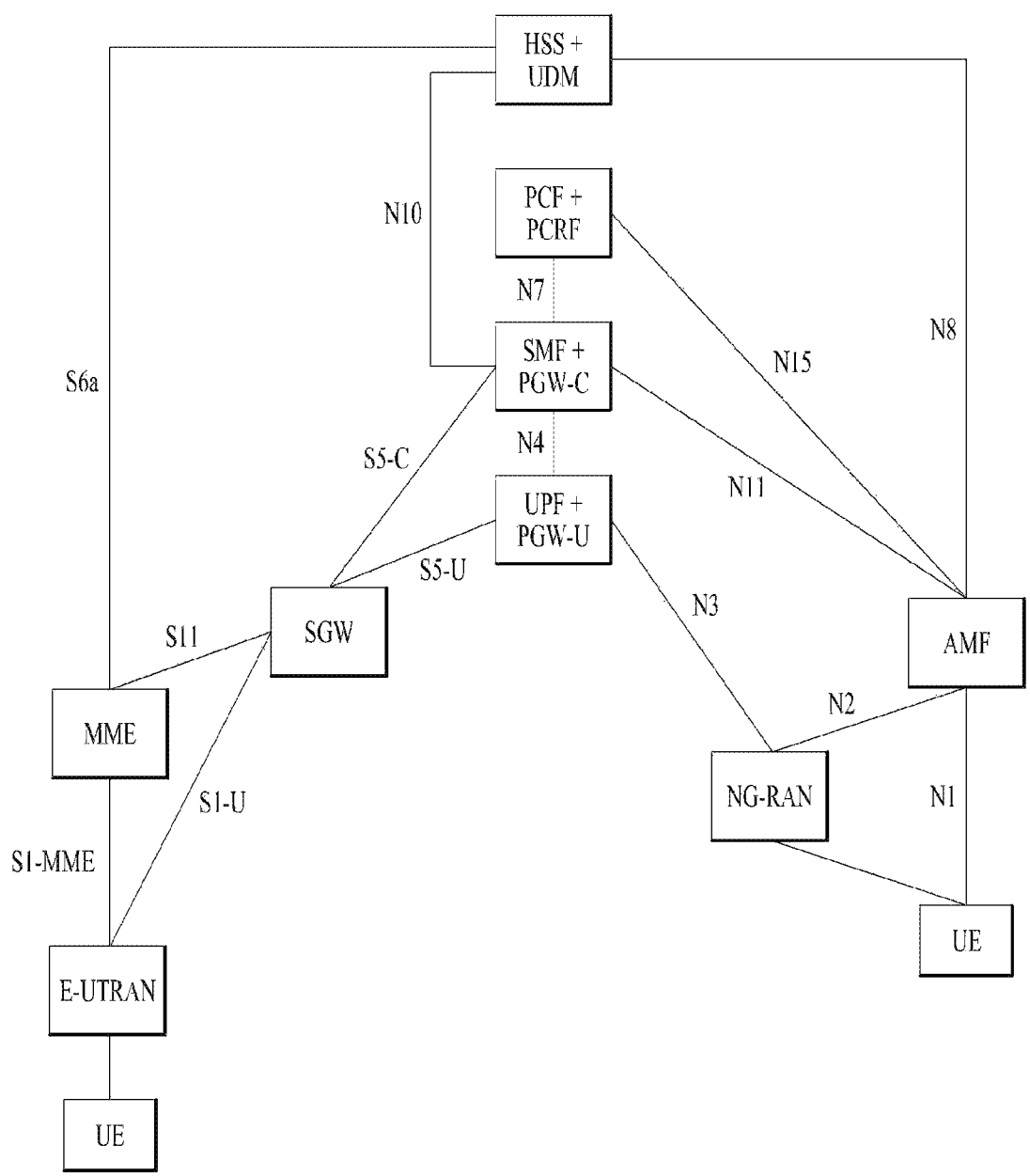
FIG. 12 is a diagram illustrating the structures of an NGS and an EPC.
Figure 13:
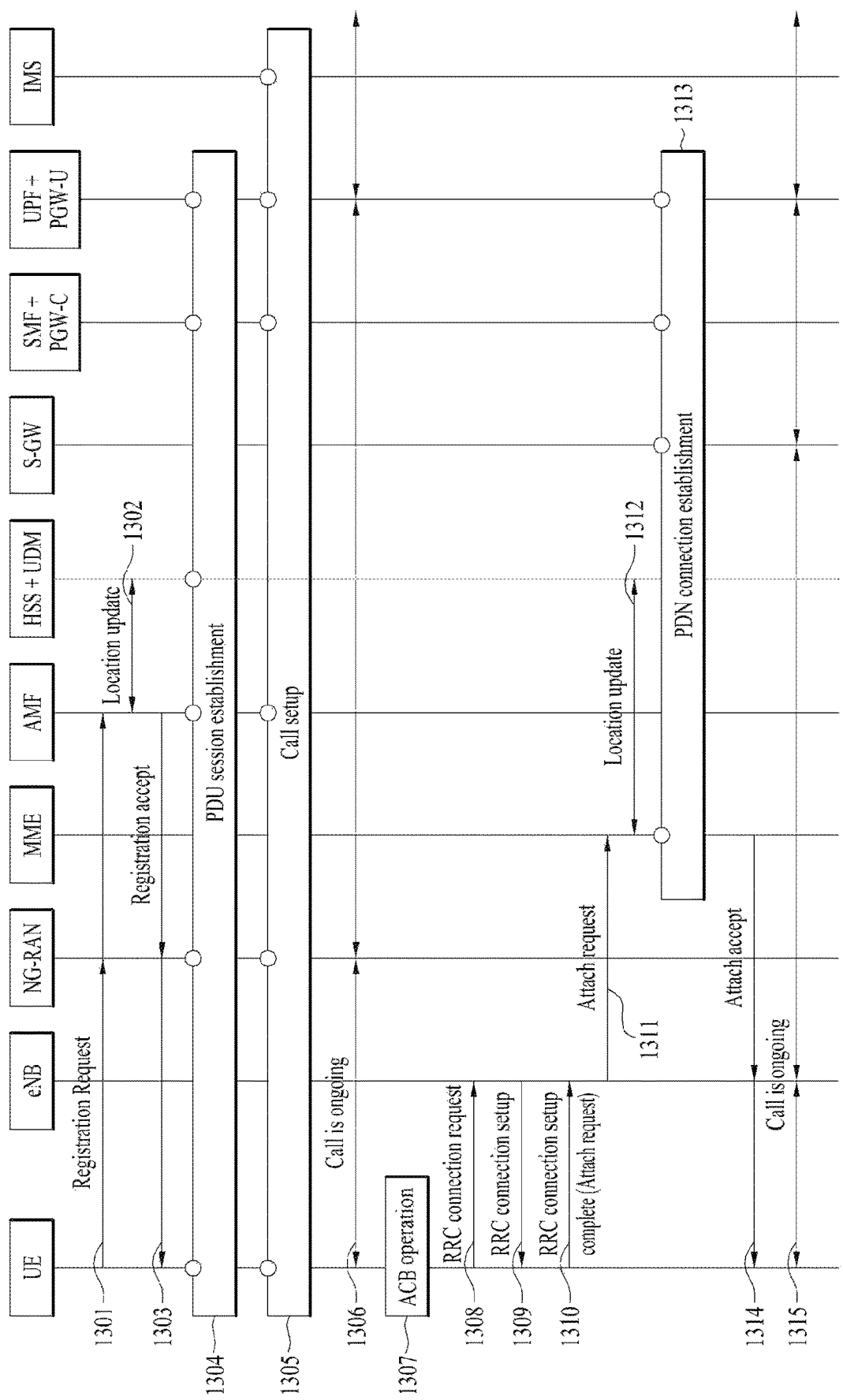
FIGS. 13 and 14 are diagrams for explaining embodiments of the present disclosure.
Figure 14:
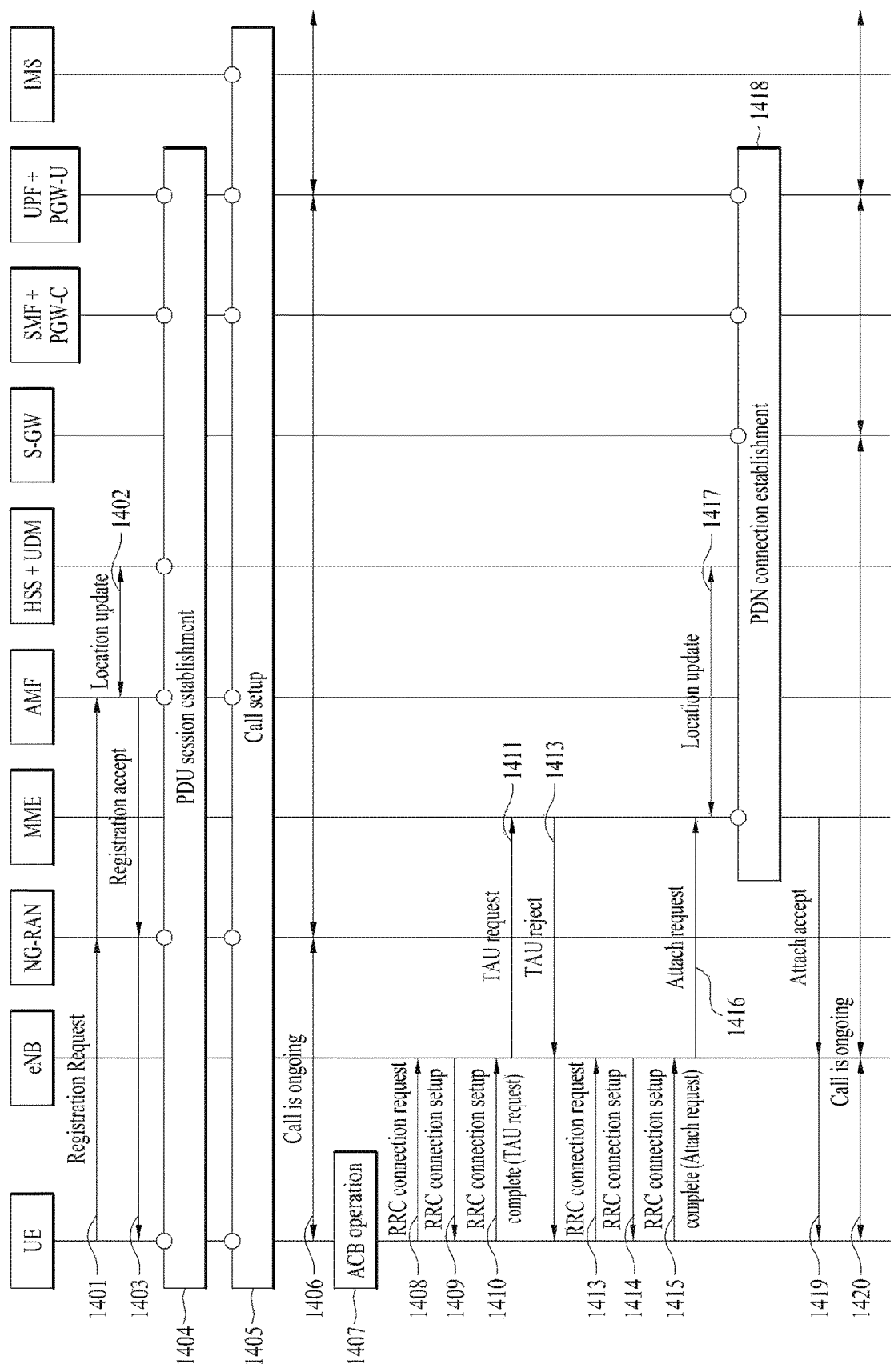

FIG. 13 illustrates in detail a procedure in which a UE is first served by a 5G system and then served by an EPS by moving from the 5G system to the EPS. The example of the particular moving procedure illustrated in FIG. 13 and the example of the particular moving procedure illustrated in FIG. 14 are based on the interworking architecture between a 5G system and an EPS illustrated in FIG. 12. HSS+UDM, which is a common subscriber information server, is used for interworking between the two systems. In addition, SMF+PGW-C and UPF+PGW-U are used for interworking between a PDU session and a PDN connection. However, there is no interface between an MME and an AMF.

Referring to FIG. 13, a UE performs a registration procedure in steps S1301 to S1303 to receive services from the 5G system. Details of the operation can be found in Clause 4.2.2.2.2 of TS 23.502 (General Registration). During the registration procedure, the AMF registers in the HSS+UDM that it is a serving node of the UE and obtains subscriber information/UE context. In step S1304, the UE performs a procedure for creating the PDU session. Details of the operation can be found in Clause 4.3.2 of TS 23.502 (PDU Session Establishment). While the PDU session is created, the SMF+PGW-C registers in the HSS+UDM that it is a serving node for the corresponding PDU session. If the UE creates multiple PDU sessions, step S1304 is repeated.

In step S1305, the UE performs a call setup due to the occurrence of a mobile originating call or a mobile terminating call. This corresponds to an IMS session establishment operation based on the IMS, and details thereof can be found in TS 23.228. In this step, a procedure for modifying the PDU session needs to be performed to satisfy the QoS required for a voice or video call. Details thereof can be found in Clause 4.3.3 of TS 23.502 (PDU Session Modification) and Clause 5.7 of TS 23.501 (QoS Model). If the UE intends to create a voice call, the PDU session should be modified such that the QoS characteristics with a 5G QoS Identifier (5QI) of 1 are met.

In step S1306, the UE process the call and the target thereof after completing the call setup.

In step S1307, the UE determines to move to the EPS. The determination may be made for various reasons, for example, when the UE moves out of the coverage of the 5G system or according to the UE's/user's selection. Subsequently, the UE attaches to the EPS. To this end, the NAS layer of the UE creates an Attach Request message, configures an establishment cause value and a call type value, and then transfers, to the AS layer of the UE, the establishment cause value and call type value together with the Attach Request message. Since details of the establishment cause value and call type value are described above, they are not repeated here. The Attach Request message includes a PDN Connection (Connectivity) Request message for requesting the formation of a PDN connection, which is accompanied by an Attach procedure. The Attach Request message and/or the PDN Connection (Connectivity) Request message may include information related to an ongoing voice call as described above.

The AS layer of the UE performs an Access Class Barring (ACB) operation based on the information received from the NAS layer. It may be interpreted to mean that when ACB information corresponding to the call type received from an eNB is present, the ACB operation is performed based on the ACB information.

In step S1308, the UE (i.e., the AS layer of the UE) transmits an RRC Connection Request message to the eNB. In this case, the establishment cause value, which is transferred from the NAS layer of the UE to the AS layer thereof in step S1307, is included in the RRC Connection Request message.

In step S1309, the eNB transmits an RRC Connection Setup message to the UE in response to the RRC Connection Request message transmitted from the UE. The eNB may determine whether to accept or reject the request from the UE based on the establishment cause value included in the RRC Connection Request. When the eNB rejects the request, the eNB transmits an RRC Connection Reject message to the UE.

As described above, based on the establishment cause value included in the RRC Connection Request message, the eNB recognizes that the UE sends the RRC Connection Request while the UE has an ongoing voice/video call and then determines to accept the RRC Connection Request by considering the fact that the UE sends the RRC Connection Request while having the ongoing voice/video call. For example, in the case of congestion, the eNB may accept the RRC Connection Request from the UE having the ongoing voice/video call by prioritizing the UE over a UE that sends an RRC Connection Request by configuring an establishment cause value as MO signalling.

In step S1310, the UE transmits an RRC Connection Setup Complete message to the eNB after the eNB accepts the RRC Connection Request. When configuring the RRC Connection Setup Complete message, the AS layer of the UE includes the Attach Request message received from the NAS layer therein In step S1311, the eNB forwards the Attach Request message to the MME. The MME may use the information related to the ongoing voice call (for example, a parameter indicating that the ongoing voice/video call is present) to determine whether to accept or reject the Attach Request message. For example, when the network is congested, the MME may accept the Attach Request from the UE that sends the parameter indicating that the ongoing voice/video call is present by including the parameter in the Attach Request by prioritizing the UE over a UE that does not send such a parameter.

In step S1312, after determining to accept the Attach Request, the MME registers in the HSS+UDM that it is a serving node of the UE and obtains the subscriber information/UE context. In particular, the information obtained from the HSS+UDM contains SMF+PGW-C information for the PDU session created by the UE in the 5G system.

In step S1313, the MME may use the parameter indicating that the ongoing voice/video call is present to determine whether to accept or reject the PDN Connection (Connectivity) Request included in the Attach Request message. For example, in the case of congestion, an APN corresponding to the PDN connection may accept the PDN Connection Request from the UE that requests the generation of the PDN connection by including the information related to the ongoing voice call (for example, the parameter indicating that the ongoing voice/video call is present) therein by prioritizing the UE over a UE that does not include such a parameter.

After determining to accept the PDN Connection Generation Request, the MME may determine to which SMF+PGW-C the MME needs to request the PDN connection, which should be generated based on the SMF+PGW-C information obtained from the HSS+UDM in step S1312. This may be possible by using the SMF+PGW-C information of the PDU session when the Data Network Name (DNN) of the corresponding PDU session generated in the 5G system is equal to the Access Point Name (APN) of the PDN connection to be generated in the EPS. That is, when the DNN of the PDU session is the DNN for the IMS, the SMF+PGW-C registers in the HSS+UDM that it serves the PDU session created for the DNN of the IMS in step S1304. That is, after obtaining the information from the HSS+UDM in step S1312, the MME may determine to which SMF+PGW-C the MME should send the generation request in order to generate the PDN connection for the APN of the IMS. The MME creates the PDN connection with the SMF+PGW-C via an S-GW.

In step S1314, the MME transmits an Attach Accept message to the UE. Details of the UE's Attach operation can be found in Clause 5.3.2.1 of TS 23.401 (E-UTRAN Initial Attach).

In step S1315, the UE may continue to proceed with the call, which the UE has performed in the 5G system, through the PDN connection created in the EPS. To satisfy the QoS required for the voice or video call, the procedure for modifying the PDN connection should also be performed in the EPS. The procedure may be initiated by the UE or by the SMF+PGW-C. When the UE initiates the procedure, the UE may initiate a procedure for requesting the network to create a dedicated bearer after receiving the Attach Accept message in step S1314 in order to meet the QoS required for the voice or video call. Details thereof can be found in Clause 5.4.5 of TS 23.401 (UE Requested Bearer Resource Modification). Alternatively, instead of the UE, the SMF+PGW-C may initiate the generation of the dedicated bearer to meet the QoS required for the voice or video call. The SMF+PGW-C may make the above determination since it serves the PDU session for the same service (i.e., IMS service) in the 5G system, and/or it may make the determination based on the information, i.e., the parameter indicating that the ongoing voice/video call is present, which the MME includes when requesting the PDN connection generation. Details of the procedure in which SMF+PGW-C creates a dedicated bearer can be found in Clause 5.4.1 of TS 23.401 (Dedicated Bearer Activation). For example, the UE or the SMF+PGW-C may determine that a dedicated bearer with QCI=1 corresponding to 5QI=1 of the 5G system needs to be created.

Although it is described that the PDN connection for the IMS is generated during the Attach procedure, the PDN connection for the IMS may also be generated after the Attach procedure. In this case, when requesting the PDN connection generation, the UE may include the information related to the ongoing voice call (i.e., the parameter indicating that the ongoing voice/video call is present) in the PDN Connection (Connectivity) Request message as described above.

Example 2 of Particular Moving Procedure

FIG. 14 illustrates a procedure in which a UE is first served by a 5G system and then served by an EPS by moving from the 5G system to the EPS. FIG. 14 is different from FIG. 13 in that the UE performs a Tracking Area Update (TAU) operation rather than the Attach operation in order to receive services from the EPS. That is, since the UE has registered in the 5G system even though the 5G system is different from the EPS, the UE performs the TAU to inform its location change instead of performing the Attach operation for initial registration in the system. However, since there is no interface between an MME and an AMF according to the present disclosure, the MME cannot obtain the context of the UE and thus transmits, to the UE, a TAU Reject message to inform that the TAU Request is rejected. As a result, the UE performs the Attach operation towards the EPS.

Hereinafter, the unique features of FIG. 14 will be described, and other unmentioned steps are assumed to be equal to steps described above with reference to FIG. 13.

Steps S1401 to S1406 are equivalent to steps S1301 to S1306 of FIG. 13, respectively.

In step S1407, the UE determines to move to the EPS since it is out of the coverage of the 5G system. Accordingly, the UE attempts to perform the TAU towards the EPS. Specifically, the NAS layer of the UE creates a TAU Request message, configures an establishment cause value and a call type value, and then transfers, to the AS layer of the UE, the establishment cause value and call type value together with the TAU Request message. Since details of the establishment cause value and call type value are described above, they are not repeated here. The TAU Request message may include information related to an ongoing voice call (e.g., a parameter indicating that there is an ongoing voice/video call). The identifier of the UE, which is included in the TAU Request message, is based on the identifier given by the AMF when the UE is registered in the 5G system. In other words, the identifier of the UE may be an ID configured based on the UE's temporary ID given by the AMF.

The AS layer of the UE performs an Access Class Barring operation based on the information received from the NAS layer. It may be interpreted to mean that when ACB information corresponding to the call type received from an eNB is present, the ACB operation is performed based on the ACB information.

Steps S1408 and S1409 are equivalent to steps S1308 and S1309 of FIG. 13, respectively.

In step S1410, the UE transmits an RRC Connection Setup Complete message to the eNB after the eNB accepts an RRC Connection Request. When configuring the RRC Connection Setup Complete message, the AS layer of the UE includes the TAU Request message received from the NAS layer therein.

In step S1411, the eNB forwards the TAU Request message to the MME. The MME checks the identifier of the UE included in the TAU Request message. Since the ID is configured based on the temporary ID given by the AMF to the UE as described in step S1407, the MME having no interface with the AMF cannot process the TAU Request. In other words, the MME is unable to receive the context of the UE from the AMF. Thus, the MME determines to reject the TAU Request.

In step S1412, the MME transmits the TAU Reject message to the UE. According to the prior art, when an MME determines that a network is congested, the MME may include time information in order to prevent a UE from requesting Mobility Management (MM) when transmitting an TAU Reject message. That is, the MME may configure the value of T3346 (backoff timer) as it desires and then transmits the T3346 value by including it in the TAU Reject message. Upon receiving the T3346 value included in the TAU Reject message, the UE cannot transmit an Attach Request message, a TAU Request message, a Service Request message, etc. during the corresponding time. Here, the T3346 value may be several hours. Details of T3346 can be found in TS 24.301 and TS 24.008. However, even in the case of congestion, the MME may determine not to provide the T3346 value to the UE based on the parameter indicating that the ongoing voice/video call is present included in the TAU Request message. Thus, the UE may send an Attach Request immediately after receiving the TAU Reject message.

In step S1413, the UE determines to attach to the EPS based on the received TAU Reject. The NAS layer of the UE generates an Attach Request message, configures the establishment cause value and call type value, and then transfers, to the AS layer of the UE, the establishment cause value and call type value together with the Attach Request message. Since details of the establishment cause value and call type value are described above, they are not repeated here. The Attach Request message includes a PDN Connection (Connectivity) Request message for requesting the formation of a PDN connection, which is accompanied by an Attach procedure. The Attach Request message and/or the PDN Connection (Connectivity) Request message may include the above-described information related to the ongoing voice call.

The UE (i.e., the AS layer of the UE) transmits an RRC Connection Request message to the eNB. In this case, the establishment cause value, which is transferred from the NAS layer of the UE to the AS layer thereof in step S1407, is included in the RRC Connection Request message. Before transmitting the RRC Connection Request message to the eNB, the UE may perform the ACB operation described in step S1407 again.

Steps S1414 to S1420 are equivalent to steps S1309 to S1315, respectively.

It is apparent that while the present disclosure is described on the assumption that a UE moves from an NGS to an EPS, the disclosure can be applied when a UE moves from an EPS to an NGS as it is or after being modified by a person with ordinary skill in the art. For example, the above-described mechanism may be modified for and applied to an NGS UE and an NGS network entity/function. Since an NGS has a different network entity/function for processing an MM NAS message and an SM NAS message, the disclosure may be modified therefor.

Meanwhile, the NAS layer of a UE may recognize that there is an ongoing voice/video call in various ways including explicit and implicit methods. For example, the IMS layer may inform the NAS layer of the presence of the ongoing voice/video call, or the NAS layer of a source system may inform the NAS layer of a target system of the presence of the ongoing voice/video call (that is, when the UE moves from the NGS to the EPS, the NGS NAS layer may notify the presence of the ongoing voice/video call to the EPS NAS layer, and when the UE moves from the EPS to the NGS, the EPS NAS layer may notify the presence of the ongoing voice/video call to the NGS NAS layer).

While the present disclosure is described focusing on a case where a UE attaches to a target system, the disclosure may also be applied when the UE intends to operate in connected mode in the target system (from the perspective of a RAN and/or a CN), that is, when the UE transmits a message therefor to the network (for example, when the UE performs a TAU, a location update, a service request, etc.).

In addition to the newly defined establishment cause value, call type value, parameter value included in an Attach Request message, and parameter value included in a PDN Connectivity Request message, a separate value may be defined for an ongoing IMS emergency call. Alternatively, the newly defined value(s) may be used for an ongoing IMS emergency call.

Meanwhile, a UE may perform an Attach procedure when the UE receives a TAU Reject from a network although the UE performs a TAU towards a target system (i.e., a location update operation corresponding to a TAU towards an NGS). In this case, the TAU Reject may explicitly or implicitly include information for allowing the UE to perform the Attach procedure.

Although the present disclosure describes network nodes/functions, procedures, etc. with reference to an EPS, but the network nodes/functions and procedures of the EPS may be replaced with those of a 5G system. For example, an Attach procedure, a Detach procedure, an MME, an APN, and a PDN connection may be replaced with an (initial) registration procedure, a deregistration procedure, an Access and Mobility Management Function (AMF), a Data Network Name (DNN), and a PDU session, respectively. In the 5G system, a PDU session may not be created during an Attach procedure (i.e., during initial registration) unlike the EPS. That is, the Attach procedure may be performed only for attachment, and after completion of the procedure, the PDU session may be started. In this case, it should be interpreted to mean that the present disclosure is applied to all PDU sessions created by a UE.

Figure 15:
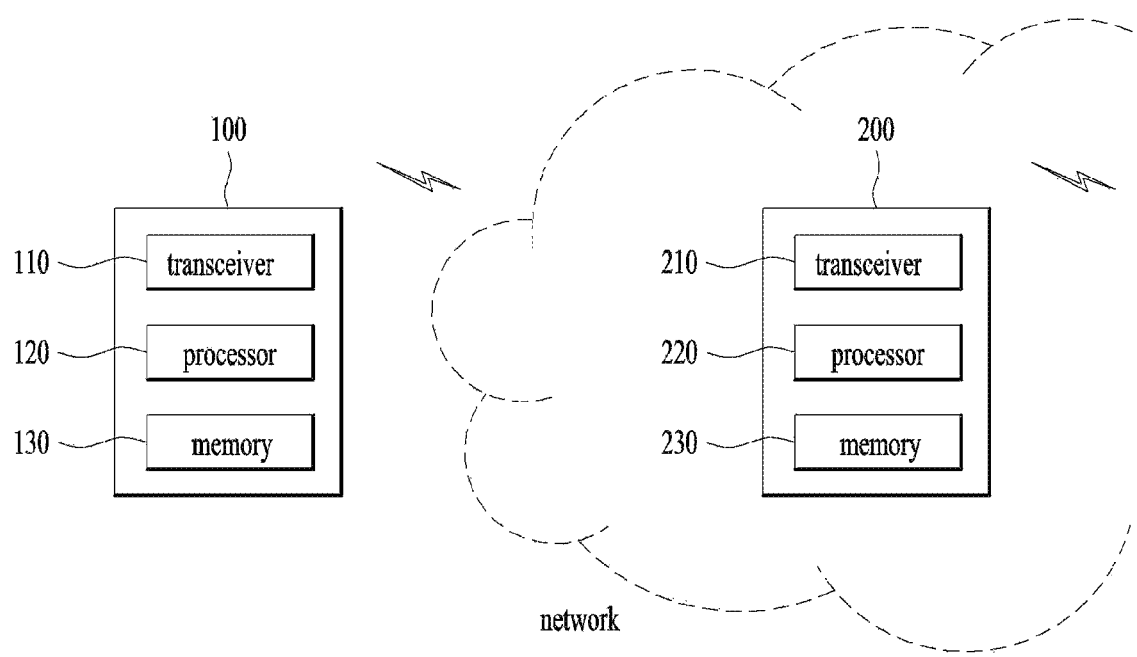
FIG. 15 is a diagram illustrating the configuration of node devices according to an embodiment of the present disclosure.

FIG. 15 illustrates the configurations of a UE device and a network node device according to an embodiment of the present disclosure.

Referring to FIG. 15, a UE device 100 according to the present disclosure may include a transceiver 110, a processor 120, and a memory 130. The transceiver 110 may be configured to transmit and receive various signals, data, and information to and from an external device. The UE device 100 may be connected to the external device by wire and/or wirelessly. The processor 120 may be configured to control the overall operations of the UE device 100 and process information to be exchanged between the UE device 100 and external device. The memory 130 may be configured to store the processed information during a predetermined time, and it may be replaced with a component such as a buffer (not shown in the drawing). In addition, the processor 120 may be configured to perform the UE operations proposed in the present disclosure.

Referring again to FIG. 15, a network node device 200 may include a transceiver 210, a processor 220, and a memory 230. The transceiver 210 may be configured to transmit and receive various signals, data, and information to and from an external device. The network node device 200 may be connected to the external device by wire and/or wirelessly. The processor 220 may be configured to control the overall operations of the network node device 200 and process information to be exchanged between the network node device 200 and external device. The memory 230 may be configured to store the processed information during a predetermined time, and it may be replaced with a component such as a buffer (not shown in the drawing). In addition, the processor 220 may be configured to perform the network node operations proposed in the present disclosure. Specifically, when a UE determines to move to an EPS, the processor 220 may be configured to transmit a Radio Resource Control (RRC) Connection Request and an Attach Request to the EPS.

When the UE determines to move to the EPS, if the UE has an ongoing voice call, the UE may maintain the ongoing voice call by performing at least one of Access Class Barring (ACB) using 'ongoing voice call' call type information or transmission of information related to an ongoing voice call through the transceiver.

The UE device 100 and the network device 200 may be implemented such that various embodiments of the present disclosure are applied independently or two or more embodiments are applied simultaneously. Redundant descriptions are omitted for clarity.

The embodiments of the present disclosure may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although the various embodiments of the present disclosure are described based on the 3GPP system, the embodiments may be applied to various mobile communication systems in the same manner.

The invention claimed is:

1. A method of moving from a Next Generation System (NGS) to an Evolved Packet System (EPS) by a User Equipment (UE) in a wireless communication system, the method comprising:

determining, by the UE, to move to the EPS based on the UE being out of coverage of the NGS or an instruction of the NGS; and transmitting a Radio Resource Control (RRC) Connection Request and an Attach Request to the EPS, wherein, based on the UE determining to move to the EPS and the UE having an ongoing voice call, the UE maintains the ongoing voice call by executing Access Class Barring (ACB) using 'ongoing voice call' call type information, or transmitting information related to the ongoing voice call, wherein, based on the UE executing ACB, executing ACB comprises:

obtaining a first barring factor for the 'ongoing voice call' call type information;

generating a random number and comparing the random number with the first barring factor; and performing a random access, wherein the random number is greater than the first barring factor, wherein the first barring factor is configured to be smaller than a second barring factor for an 'originating signaling' call type, and wherein based on transmitting information related to the ongoing voice call, the information is for informing that the ongoing voice call is present, the UE is excluded from application of congestion control performed by a network node receiving the information and the UE has higher priority for an acceptance of the RRC Connection Request than other UEs not transmitting the information.

2. A User Equipment (UE) for moving from a Next Generation System (NGS) to an Evolved Packet System (EPS) in a wireless communication system, the UE comprising:

a transceiver; and a processor, wherein the processor is configured to:

determine movement of the UE to the EPS based on at least one of the UE being out of coverage of the NGS and an instruction of the NGS; and transmit a Radio Resource Control (RRC) Connection Request and an Attach Request to the EPS, and wherein, based on the UE determining to move to the EPS and the UE having an ongoing voice call, the UE maintains the ongoing voice call by executing Access Class Barring (ACB) using 'ongoing voice call' call type information; or transmitting, via the transceiver, information related to the ongoing voice call, wherein, based on the UE executing ACB, executing ACB comprises:

obtaining a first barring factor for the 'ongoing voice call' call type information;

generating a random number and comparing the random number with the first barring factor; and performing a random access wherein the random number is greater than the first barring factor, wherein the first barring factor is configured to be smaller than a second barring factor for an 'originating signaling' call type, and wherein based on transmitting information related to the ongoing voice call, the information is for informing that the ongoing voice call is present, the UE is excluded from application of congestion control performed by a network node receiving the information, and the UE has higher priority for an acceptation of the RRC Connection Request than other UEs not transmitting the information.

\* \* \* \* \*